BEST AVAILABLE COPY

T858021

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JANUARY 21, 1969

858 O.G. 725

707,485

ORIENTED FILMS AND FIBERS OF ASPHALT AND A PROPYLENE POLYMER

James A. Kerns, 116 Rockrose Drive, Newark, Del. 19711

Filed Feb. 23, 1968. Published Jan. 21, 1969

Class 260—28.5

No Drawing. 6 Pages Specification

Preparation of oriented films and fibers containing a major portion of asphalt and a minor portion of a crystallizable, orientable polymer of propylene is taught. The orientable composition containing about 7 to 25% propylene polymer can be drawn up to about 700% to effect orientation. The polymer can be a propylene homopolymer or copolymer containing up to about 25% of a comonomer. Any extrudable polymer can be used if the IV is 1.3 or higher. Blown or unblown asphalt can be employed. Uniform mixing of the polymer and asphalt is necessary and can be accomplished by comminution of a mixture of polymer and asphalt frozen with Dry Ice, followed by extrusion wherein melt blending is effected. Drawing can be accomplished at room temperature. Utility is in film and fiber applications where a cheap product is desired and black coloration is not a bar, such as binder twine, barrel liners, or vapor barrier membranes.